United States Patent
Pfülb et al.

[11] Patent Number: 5,092,755
[45] Date of Patent: Mar. 3, 1992

[54] APPARATUS FOR EXTRUDING FLAT SYNTHETIC-RESIN STRANDS

[75] Inventors: Roland Pfülb; Herbert Müller, both of Heiligenhaus-Isenbügel, Fed. Rep. of Germany

[73] Assignee: W. Dollken & Co. GmbH, Essen, Fed. Rep. of Germany

[21] Appl. No.: 660,209

[22] Filed: Feb. 22, 1991

[30] Foreign Application Priority Data

Mar. 7, 1990 [DE] Fed. Rep. of Germany ....... 4007235

[51] Int. Cl.⁵ .......................................... B29B 11/02
[52] U.S. Cl. .................................. 425/186; 264/147; 425/192 R; 425/196; 425/307
[58] Field of Search ...................... 264/176.1, 146, 157, 264/147, 160, 145; 425/307, 308, 382, 309, 296, 186, 192 R, 196

[56] References Cited

U.S. PATENT DOCUMENTS

| | | | |
|---|---|---|---|
| 1,435,659 | 11/1922 | Roberts | 264/146 |
| 2,022,895 | 12/1935 | Morrell | 264/146 |
| 2,096,347 | 10/1937 | Short | 425/113 |
| 3,356,556 | 12/1967 | Violette et al. | 264/146 |
| 3,527,859 | 9/1970 | Fairbanks | 264/146 |
| 3,664,787 | 5/1972 | Fairbanks | 425/382 |
| 4,904,434 | 2/1990 | Hyer | 425/307 |

FOREIGN PATENT DOCUMENTS

| | | | |
|---|---|---|---|
| 3128109 | 2/1983 | Fed. Rep. of Germany | 264/147 |
| 60-21227 | 2/1985 | Japan | 425/113 |
| 63-242514 | 10/1988 | Japan | 264/146 |

Primary Examiner—Jeffery Thurlow
Attorney, Agent, or Firm—Herbert Dubno; Andrew Wilford

[57] ABSTRACT plurality of synthetic-resin strands are made in a nozzle having a housing forming a passage having an upstream end and a downstream end. The downstream end is formed as an elongated slot having a relatively great length and a relatively short width measured perpendicular to its length. An extruder connected to the housing at the upstream end of the passage introduces a fluent thermoplastic synthetic resin thereinto under pressure so the resin exits from the slot in a predetermined flow direction. A plurality of blades are retained in holders on the nozzle immediately downstream of the downstream of the passage at the slot with each blade traversing the slot crosswise of its length. Thus the resin exiting from the slot is cut by the blades into the strands. The holders are adjustable along the slot for horizontally displacing and fixing the blades so as to vary the dimensions of the strands.

3 Claims, 3 Drawing Sheets

APPARATUS FOR EXTRUDING FLAT SYNTHETIC-RESIN STRANDS

FIELD OF THE INVENTION

The present invention relates to the extrusion of flat synthetic-resin strands. More particularly this invention concerns a device capable of producing strands of different widths.

BACKGROUND OF THE INVENTION

A standard extruding assembly for making a strand has a nozzle formed with a passage having an upstream end connected to an extruder and a downstream end that is formed as a slot, that is with a relatively great length and a relatively short width. Typically the lengthwise dimension of the slot is measured horizontally and is defined between edges of upper and lower nozzle parts and the width is a vertical dimension. The extruder feeds a hot and liquefied thermoplastic resin to the upstream end of the passage under pressure so that it exits from the nozzle at the slot as a ribbon-like strand having a width dimension equal to the slot length and a thickness equal to the slot width. One edge of the slot can be nonstraight to impart a desired surface profile to the strand thus produced, giving a veined or marbled appearance to it for use as a panel edge, molding, or the like.

The width or height, that is the smaller crosswise dimension, of the slot can normally be varied to produce workpieces of different thicknesses. The slot length cannot, however, so that when the workpiece width must be changed, it is necessary to replace the nozzle or replace some parts of it. This is a fairly expensive procedure, requiring the manufacturer to stock a variety of different nozzles corresponding to the different workpiece widths needed.

OBJECTS OF THE INVENTION

It is therefore an object of the present invention to provide an improved method of and apparatus for extruding flat synthetic-resin strands.

Another object is the provision of such an improved method of and apparatus for extruding synthetic-resin strands which overcomes the above-given disadvantages, that is which allows strands of different widths to be produced relatively easily, without rebuilding the die or nozzle.

SUMMARY OF THE INVENTION

An apparatus for extruding a plurality of synthetic-resin strands according to the invention has a nozzle housing forming a passage having an upstream end and a downstream end. The downstream end is formed as an elongated slot having a relatively great length and a relatively short width measured perpendicular to its length. An extruder connected to the housing at the upstream end of the passage introduces a fluent thermoplastic synthetic resin thereinto under pressure so the resin exits from the slot in a predetermined flow direction. A plurality of blades are retained in holders on the nozzle immediately downstream of the downstream of the passage at the slot with each blade traversing the slot crosswise of its length. In fact each blade lies directly against the nozzle at the slot. Thus the resin exiting from the slot is cut by the blades into the strands. The holders are adjustable along the slot for horizontally displacing and fixing the blades so as to vary the dimensions of the strands.

Thus with this arrangement a standard wide-slot nozzle can be used to produce a plurality of relatively narrow ribbons or strands. When the widths of the strand, which are parallel to the length of the slot, must be changed, all that the operator need do is move over the holders to the new positions. This is of course much easier than changing the entire nozzle. In addition it allows the simultaneous production of a plurality of strands of the same or different widths, greatly rationalizing production.

According to further features of the invention the nozzle is formed at least at the slot of an upper nozzle part and a lower nozzle part and the holders are carried on one of the parts. Furthermore each holder is a mounting block releasably fixed to the one nozzle part. The other nozzle part can also have such formations to which the holders can be attached.

In accordance with another inventive feature a guide element extends parallel to the slot and the holders are movable along and fixable to the guide element. The nozzle can also be provided with an insert at the slot movable to vary the width of the slot.

The method of this invention therefore comprises the steps of forcing the resin in hot fluent condition into an upstream end of a nozzle passage having a downstream end formed as an elongated slot having a relatively great length and a relatively narrow width so that the resin emerges from the slot and positioning a plurality of blades across the slot immediately downstream thereof so that the resin emerging from the slot is longitudinally subdivided into the strands before it cools and hardens.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
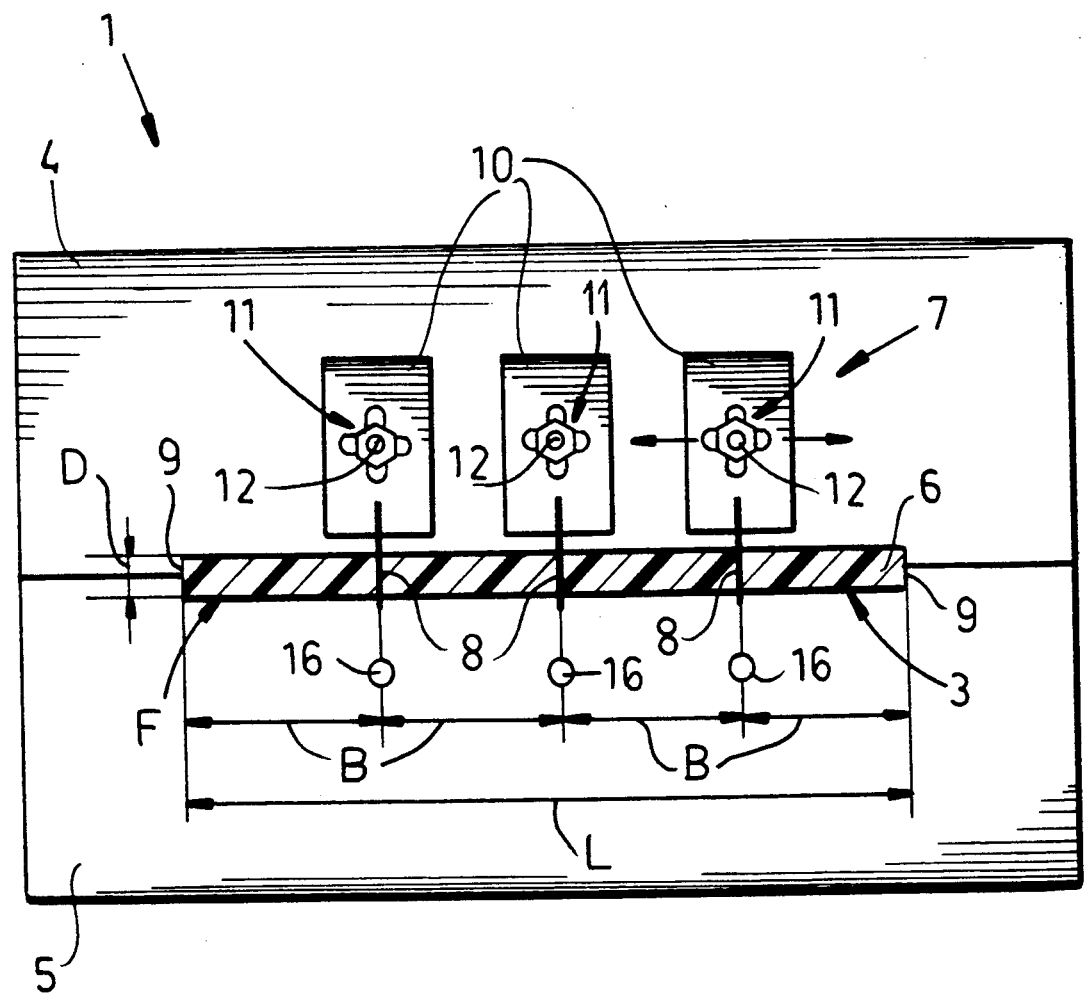
FIG. 1 is an end view of a nozzle according to this invention.
Figure 2:
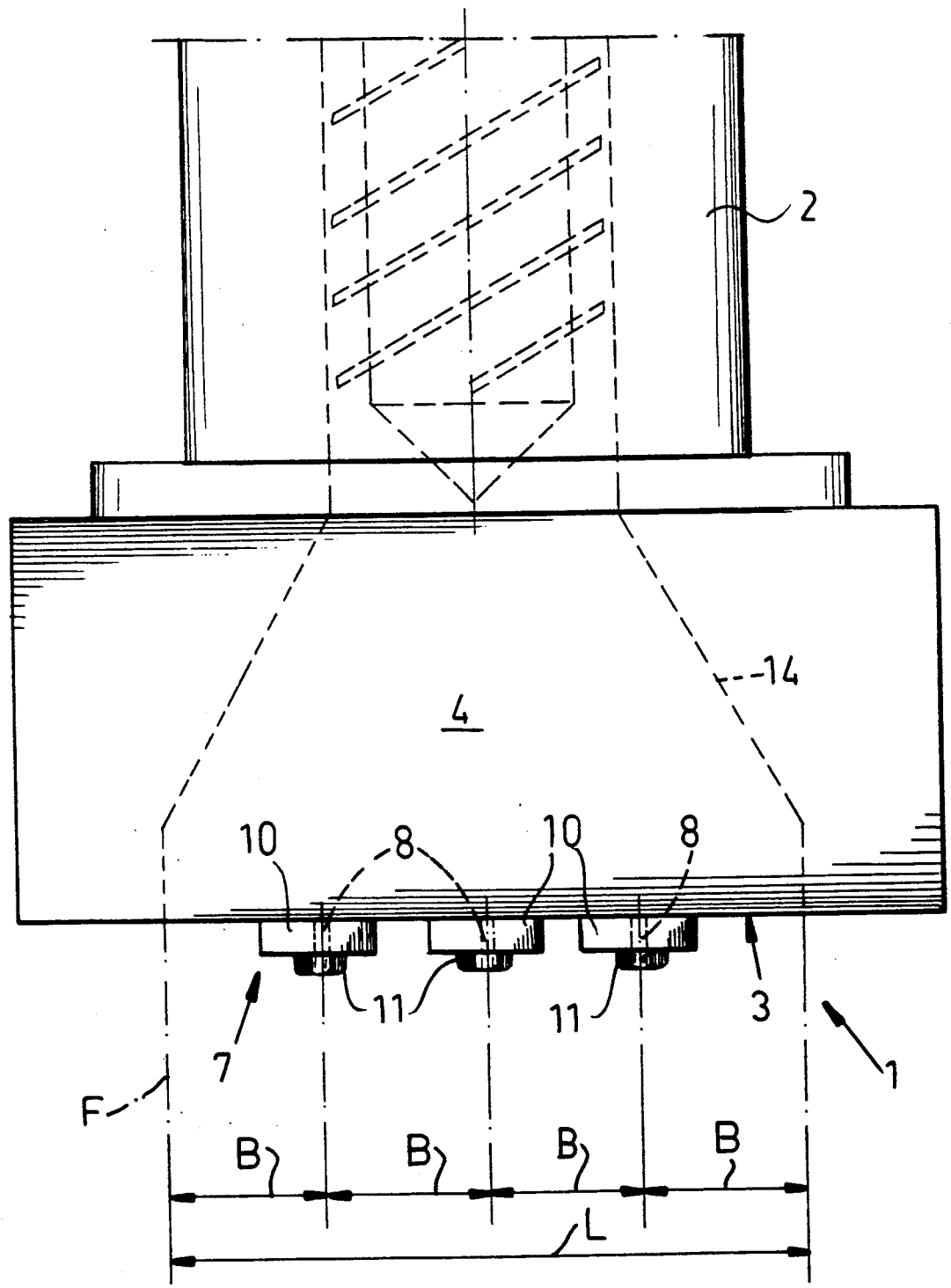
FIG. 2 is a top view of the extruding assembly having the nozzle of FIG. 1.

As seen in FIGS. 1 and 2 a nozzle 1 according to this invention is carried on an extruder 2 and is formed with a flow passage 14 having an upstream end that the extruder 2 opens into and a downstream end or slot 3 that is of rectangular shape, with a length L and a width D, the latter being about one-twentieth the former. The nozzle 1 is formed by a top part 4 and a bottom part 5 that together define the opening or slot 3. The extruder delivers a hot, fluent thermoplastic resin to the passage 14 so it will normally emerge from the end 3 as a flat band or strand F having a width equal to the slot length L and a thickness equal to the slot width D.

According to this invention a cutter assembly 7 is fixed to one of the parts 4 and 5, here to the part 4, and has three flat planar blades 8 that are oriented vertically and perpendicular to the direction of the length L. These blades 8 are secured in holders 10 that position them so they are spaced apart by a distance B from each other and from narrow ends 9 of the slot 3. These holders 10 in turn ar secured in place by loosenable screws 11 so that the blades 8 can be moved horizontally along the slot 3 to vary the dimensions B. Thus the strand F is subdivided into a plurality of substrands 6 each having a thickness equal to the slot width D and a width equal to the respective dimension B.

Here the screws 11 for the holder blocks 10 are fitted in holes 12 in the upper nozzle part 4. They could also be fitted to such holes 16 in the lower part 5, or some could be on the upper part 4 and the others on the lower part 5.

Figure 3:
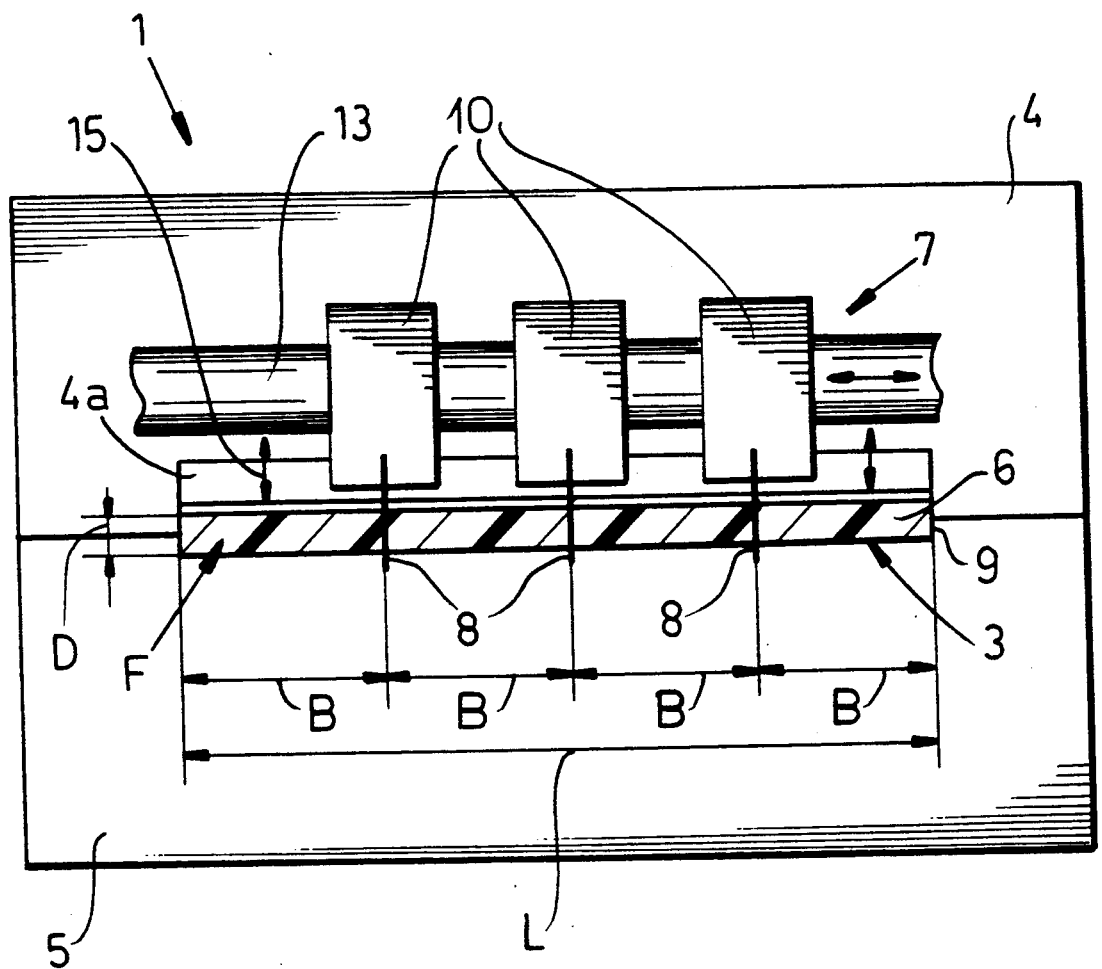
FIG. 3 is a view like FIG. 1 of an alternative arrangement according to this invention.

FIG. 3 shows an alternative arrangement wherein the blade holders 10 are held on a guide bar 13 that can be moved parallel to the slot 3 for adjusting the dimensions B. In addition in this embodiment the nozzle part 4 has an inset piece 4a defining one long edge of the slot 3 so that the dimension D can be adjusted by moving this piece 4a as indicated by arrow 15.

We claim:

1. An apparatus for extruding a plurality of synthetic-resin strands, the apparatus comprising:
    a nozzle housing forming a passage having an upstream end and a downstream end, the downstream end being formed of an upper nozzle part and a lower nozzle part flanking and defining an elongated slot having a relatively great length and a relatively short width measured perpendicular to its length;
    means including an extruder connected to the housing at the upstream end of the passage for introducing a fluent thermoplastic synthetic resin thereinto, whereby the resin exits from the slot in a predetermined flow direction;
    a plurality of blades;
    respective mounting blocks holding the blades, carried on one of the nozzle parts, and retaining the blades on the nozzle housing immediately downstream of the downstream end of the passage at the slot with each blade traversing the slot crosswise of its length, whereby the resin exiting from the slot is cut by the blades into the strands; and
    adjustment means releasably securing the mounting blocks on the one part for horizontally displacing and fixing the blades so as to vary the dimensions of the strands.

2. The apparatus defined in claim 1 wherein the other parts has formations to which the holders can be attached.

3. The apparatus defined in claim 1, further comprising
    a guide element extending parallel to the slot, the mounting blocks being movable along and fixable to the guide element.

* * * * *